US012758858B2

(12) United States Patent
Postnikov

(10) Patent No.: US 12,758,858 B2
(45) Date of Patent: Oct. 13, 2026

(54) METHOD OF RANKING AND AN APPARATUS FOR SELECTING THE BEST BUYER'S AGENTS IN AN AREA

(71) Applicant: Vladimir Postnikov, Binghamton, NY (US)

(72) Inventor: Vladimir Postnikov, Binghamton, NY (US)

( * ) Notice: Subject to any disclaimer, the term of this patent is extended or adjusted under 35 U.S.C. 154(b) by 345 days.

(21) Appl. No.: 18/601,154

(22) Filed: Mar. 11, 2024

(65) Prior Publication Data

US 2025/0281820 A1 Sep. 11, 2025

(51) Int. Cl.
*A63F 3/00* (2006.01)
*G06Q 50/16* (2024.01)

(52) U.S. Cl.
CPC ......... *A63F 3/00261* (2013.01); *G06Q 50/16* (2013.01); *A63F 2003/00302* (2013.01)

(58) Field of Classification Search
CPC ....... A63F 3/00261; A63F 2003/00302; G06Q 50/16
See application file for complete search history.

(56) References Cited

U.S. PATENT DOCUMENTS 3,109,652 A * 11/1963 Strand ................. A63F 3/00072 273/287
3,211,458 A * 10/1965 Wells ........................ A63F 5/04 273/287
2013/0214489 A1* 8/2013 Mintz .................. A63F 9/0641 273/292
2022/0362658 A1* 11/2022 Omidi ................. A63F 3/00214

* cited by examiner

*Primary Examiner* — Jeffrey S Vanderveen

(57) ABSTRACT

The present invention discloses an apparatus and method designed to facilitate the selection of the best buyer's agents. The apparatus consists of a transparent circular base equipped with a centrally positioned pole, around which three inserts with arrows can be attached. These inserts, each associated with a potential buyer's agent's location on an accompanying rectangular map, lay flat against the base once secured. A spinner, attachable to the pole, is designed to spin and point to one of these inserts, thereby selecting a buyer's agent in a visually engaging manner. This method introduces an element of geography in the selection process while maintaining a structured approach, offering a unique solution for individuals or organizations seeking to choose a buyer's agent without inherent biases. The invention is particularly suited for applications where impartiality is valued in the decision-making process, providing a transparent, fair, and interactive method for selection.

2 Claims, 7 Drawing Sheets

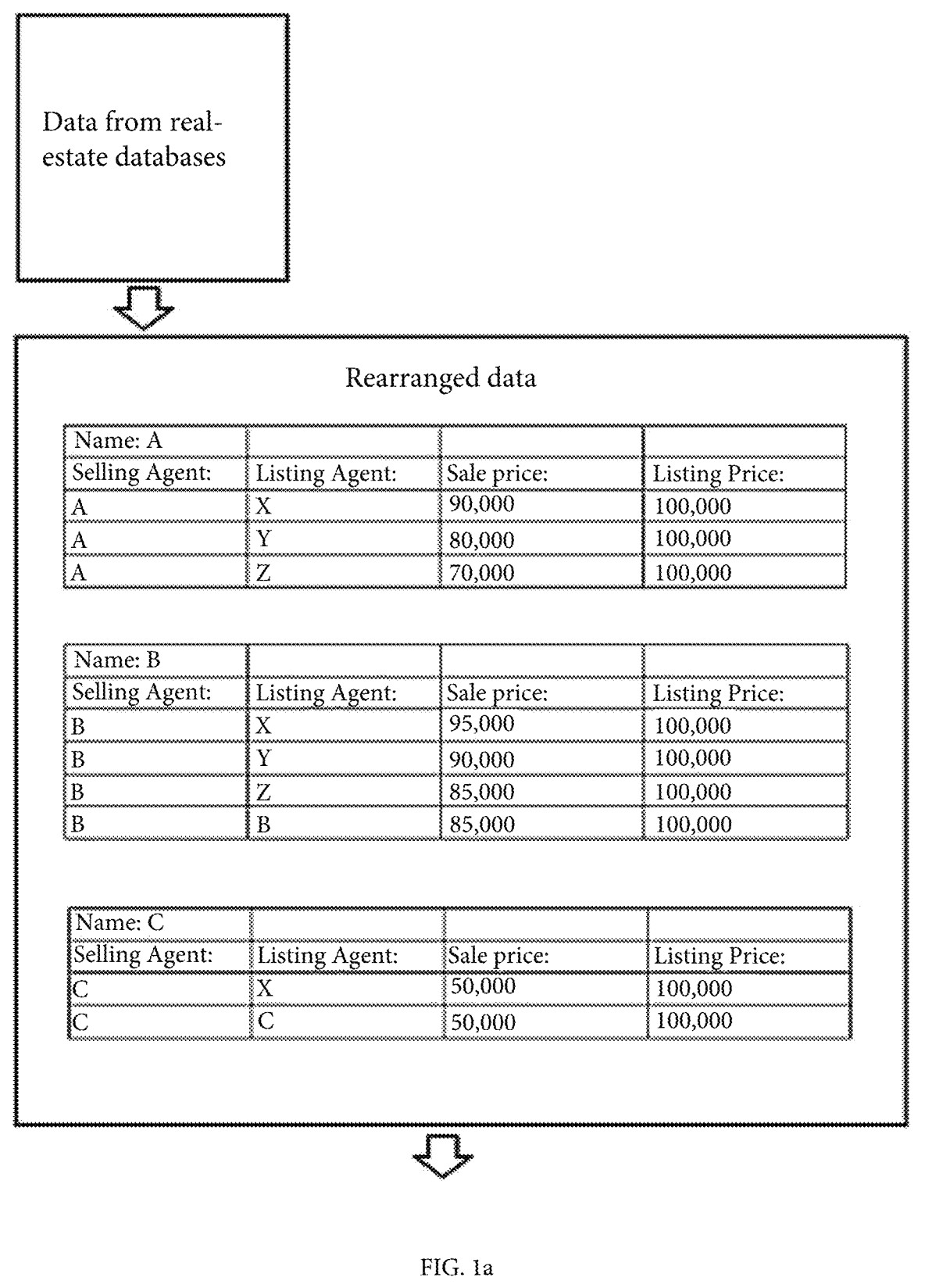

Data from real-estate databases

Rearranged data

| Name: A | | | |
|---|---|---|---|
| Selling Agent: | Listing Agent: | Sale price: | Listing Price: |
| A | X | 90,000 | 100,000 |
| A | Y | 80,000 | 100,000 |
| A | Z | 70,000 | 100,000 |

| Name: B | | | |
|---|---|---|---|
| Selling Agent: | Listing Agent: | Sale price: | Listing Price: |
| B | X | 95,000 | 100,000 |
| B | Y | 90,000 | 100,000 |
| B | Z | 85,000 | 100,000 |
| B | B | 85,000 | 100,000 |

| Name: C | | | |
|---|---|---|---|
| Selling Agent: | Listing Agent: | Sale price: | Listing Price: |
| C | X | 50,000 | 100,000 |
| C | C | 50,000 | 100,000 |

FIG. 1a

Remove data where the selling agent was also the listing agent

| Name: A | | | |
|---|---|---|---|
| Selling Agent: | Listing Agent: | Sale price: | Listing Price: |
| A | X | 90,000 | 100,000 |
| A | Y | 80,000 | 100,000 |
| A | Z | 70,000 | 100,000 |

| Name: B | | | |
|---|---|---|---|
| Selling Agent: | Listing Agent: | Sale price: | Listing Price: |
| B | X | 95,000 | 100,000 |
| B | Y | 90,000 | 100,000 |
| B | Z | 85,000 | 100,000 |
| ~~B~~ | ~~B~~ | ~~85,000~~ | ~~100,000~~ |

| Name: C | | | |
|---|---|---|---|
| Selling Agent: | Listing Agent: | Sale price: | Listing Price: |
| C | X | 50,000 | 100,000 |
| ~~C~~ | ~~C~~ | ~~50,000~~ | ~~100,000~~ |

FIG. 1b

Remove selling agents that were part of fewer than three sales in the past year

| Name: A | | | |
|---|---|---|---|
| Selling Agent: | Listing Agent: | Sale price: | Listing Price: |
| A | X | 90,000 | 100,000 |
| A | Y | 80,000 | 100,000 |
| A | Z | 70,000 | 100,000 |

| Name: B | | | |
|---|---|---|---|
| Selling Agent: | Listing Agent: | Sale price: | Listing Price: |
| B | X | 95,000 | 100,000 |
| B | Y | 90,000 | 100,000 |
| B | Z | 85,000 | 100,000 |

| ~~Name: C~~ | | | |
|---|---|---|---|
| Selling Agent: | Listing Agent: | Sale price: | Listing Price: |
| C | X | 50,000 | 100,000 |

FIG. 1c

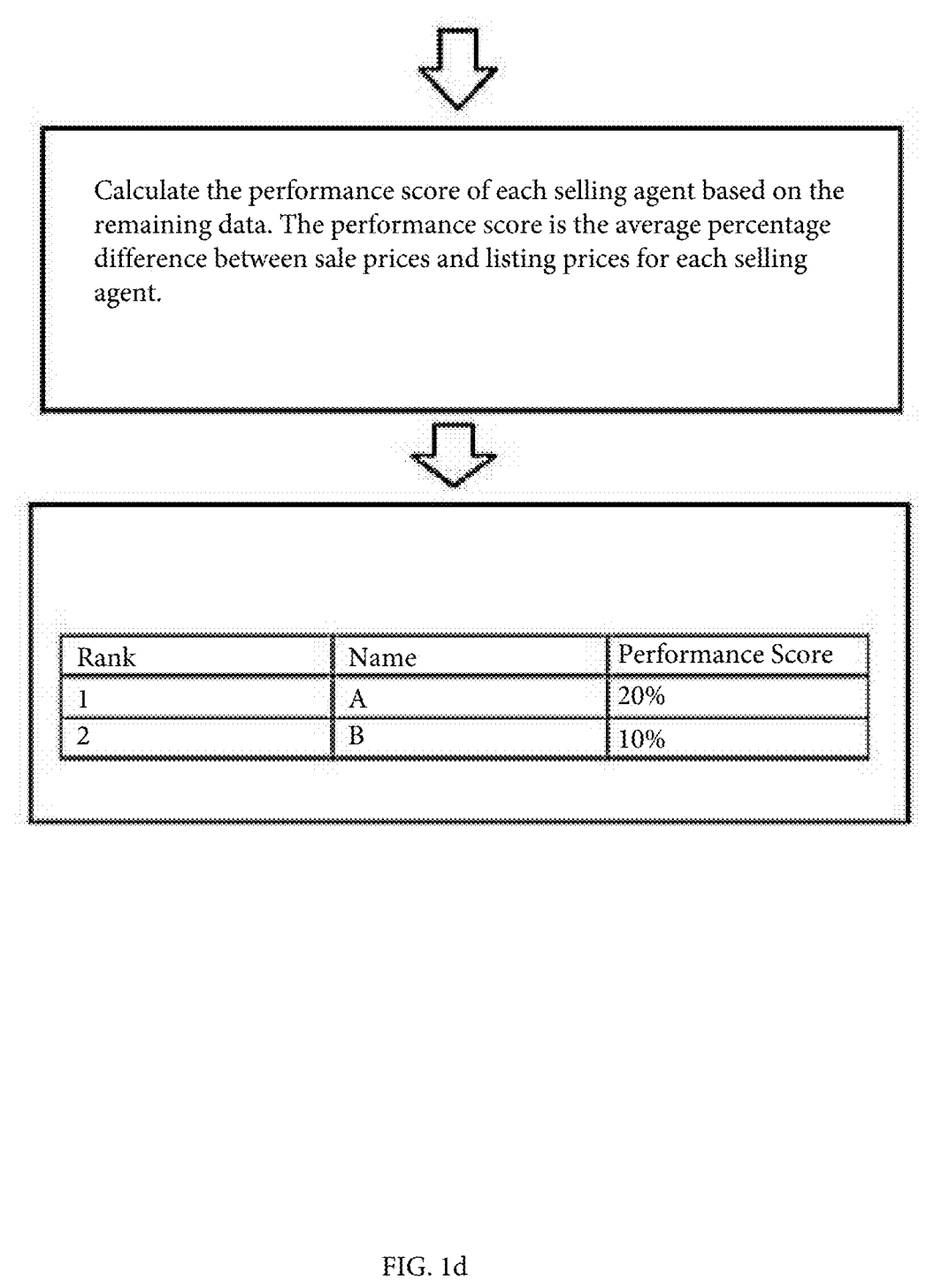

Calculate the performance score of each selling agent based on the remaining data. The performance score is the average percentage difference between sale prices and listing prices for each selling agent.

| Rank | Name | Performance Score |
|---|---|---|
| 1 | A | 20% |
| 2 | B | 10% |

FIG. 1d

METHOD OF RANKING AND AN APPARATUS FOR SELECTING THE BEST BUYER'S AGENTS IN AN AREA

FIELD OF INVENTION

The present invention relates generally to the field of decision-making tools and specifically to an apparatus and method for selecting a quality buyer's agent.

BACKGROUND

The terms "seller's agent" and "listing agent" are used interchangeably throughout this disclosure. Similarly, the terms "buyer's agent" and "selling agent" are used interchangeably throughout this disclosure.

Buyer's agents represent clients who are trying to buy a Real Estate property. Buyer's agents work to find the most suitable property for a buyer, and then they try to negotiate the lowest possible price for the property. An effective buyer's agent can consistently secure a sale price lower than their competitors for the same property.

BRIEF SUMMARY OF THE INVENTION

The invention provides an apparatus and method designed to assist individuals or entities in selecting a quality buyer's agent in a structured manner. The apparatus comprises a substantially transparent circular base, which allows for easy visibility of underlying materials, with a central pole extending upward when the base is placed on a flat surface. Attached to this base are three inserts, each designed with proximal and distal ends, where the proximal end is configured to securely attach to the pole, ensuring the insert lies flat against the base. In some embodiments, the distal ends of the inserts depict an arrow.

Accompanying the apparatus is a rectangular map, the dimensions of which exceed the circular base's diameter, allowing for a comprehensive and scaled representation of potential buyer's agent locations. A spinner, attachable to the pole and capable of spinning around the pole, serves as the selection pointer once the user engages it.

The methodology underlying the apparatus's use involves aligning each insert on the base to correspond with a buyer's agent's location on the map, thereby establishing a physical connection between the insert and the agent's primary office. Upon engaging the spinner, its rotation and eventual resting point direct the user to a specific insert, which in turn indicates the selected buyer's agent. This inventive approach not only provides a tangible, interactive means for selection but also introduces an element of fairness in the choice, potentially reducing biases in the decision-making process.

In practice, a method of selecting the set of quality buyer's agents to choose from with the aforementioned apparatus can be determined by the a method comprising: choosing a target area, receiving buyer's agent performance data for all real estate buyer's agents from a real estate database in the target area, preferably at least for the last year, removing any agent data for agents who acted as both the buyer's agent and the listing agent in the same transaction, removing any agent data for agents who were part of fewer than a set amount of completed sales, ranking all real estate buyer's agents by using a ranking algorithm on the remaining agent data, and choosing a set of the top three buyer's agents from the generated ranking.

BRIEF DESCRIPTION OF THE DRAWINGS

FIGS. 1*a*-1*d* depict a potential method of selecting a set of quality buyer's agents to choose from.

DETAILED DESCRIPTION OF THE INVENTION

The terminology used herein is for the purpose of describing particular embodiments only and is not intended to be limiting of the invention. As used herein, the terms "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning in the context of relevant art and the present disclosure will not be interpreted in an idealized or overly formal sense unless expressly so defined herein.

In describing the invention, it will be understood that a number of techniques and steps are disclosed. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claim.

The present invention provides an innovative apparatus and method for selecting a quality buyer's agent, designed to integrate elements of user interaction in the selection process. Below is a detailed description of the components of the apparatus and the steps involved in the method, elucidating the operation and utility of the invention.

Figure 2:
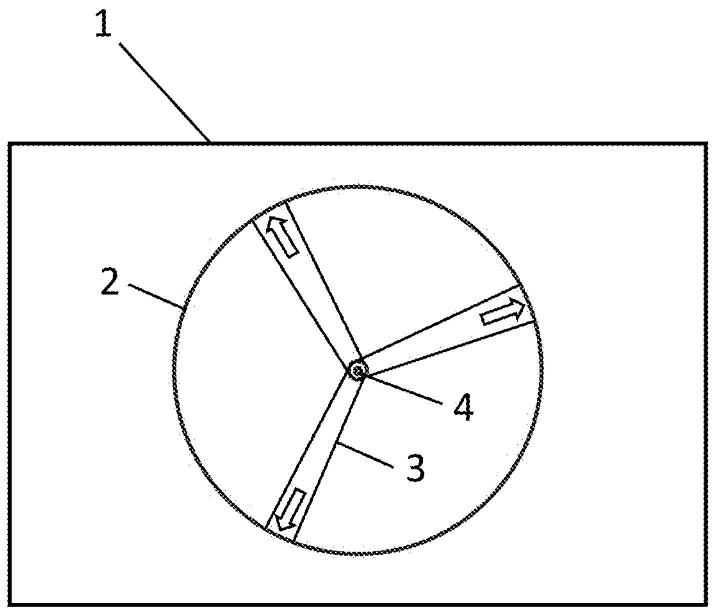
FIG. 2 is a top plan view of an apparatus for selecting a quality buyer's agent with the spinner removed and a blank map for clarity.

The apparatus features a circular base 2, made from a substantially transparent material, allowing users to view underlying materials such as maps or diagrams. This base is depicted in FIG. 2, which shows a top plan view of the apparatus with the base lying flat and the spinner removed for clarity.

A pole 4 extends upwards from the center of the circular base 2. This pole, visible in FIGS. 2 and 3, serves as the central axis for the inserts 3 and the spinner 5 to attach and pivot around. It is designed to ensure vertical alignment when the base is placed on a flat surface.

The apparatus includes three inserts 3, each designed to attach to the pole 4 at its proximal end and extend radially outward at its distal end. These inserts, which lie flat on the circular base 2 when attached, are most clearly visible in FIGS. 2 and 3. They represent potential choices or categories in the selection process and are designed for easy attachment and detachment. The arc of the distal end of each insert is 12.5 degrees. In some embodiments, the distal ends of the inserts depict an arrow pointing away from the proximal ends.

A spinner 5, attachable to the pole 4 and capable of spinning freely, serves as the primary selection indicator. The spinner, visible in FIG. 3 when attached to the pole, and in FIG. 4 during operation, points to one of the inserts 3 to indicate the chosen buyer's agent when it comes to rest.

Figure 3:
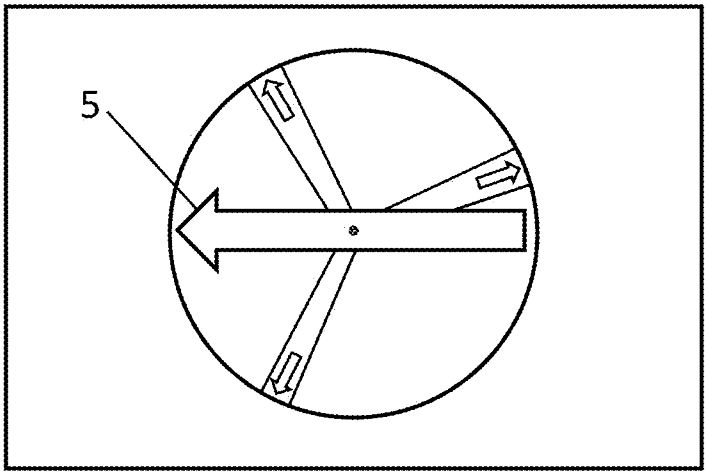
FIG. 3 is a top plan view of the apparatus of FIG. 2 with the spinner attached.

A blank map, used for illustrative purposes in FIG. 2 and FIG. 3, provides clarity on the apparatus's structure without the distraction of detailed map features. An exemplary city map 6, shown in FIG. 4, demonstrates the apparatus's functionality in a real-world context. It is placed beneath the transparent circular base 2, aligning specific locations with the inserts 3.

The previously described apparatus can be used in the following manner:

Preparation: The user positions the exemplary city map 6 beneath the circular base 2, aligning it so that different areas on the map correspond with the various inserts 3.

Insert Attachment: The user attaches each insert 3 to the pole 4, as depicted in FIGS. 2 and 3, ensuring they are securely in place and lie flat on the base. Each insert should be positioned to correspond with a buyer's agent's location on the map, thereby establishing a physical connection between the insert and the agent's primary office.

Figure 4:
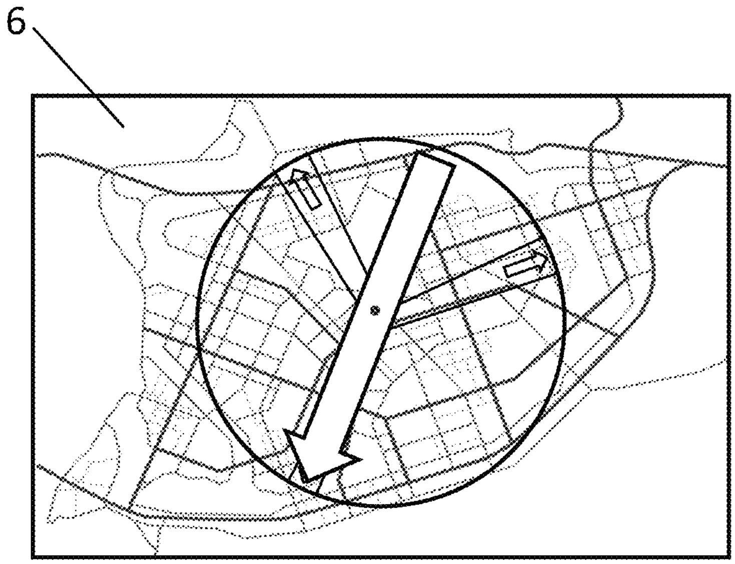
FIG. 4 is a top plan view of the apparatus of FIG. 3 with an exemplary city map.

Spinner Attachment and Use: The user attaches the spinner 5 to the pole 3, as shown in FIG. 3. The spinner is then spun, rotating around the pole and over the base, eventually pointing to one of the inserts 3 upon coming to rest, as depicted in FIG. 4. In some embodiments, each end of the spinner includes two wheels that facilitate the rotation of the spinner when it is engaged.

Selection: The insert 3 indicated by the spinner 5 corresponds to a specific location on the map and, thereby, a particular buyer's agent, who is then selected for the user's purposes.

In practice, the set of quality buyer's agents to choose from can be determined by choosing the top three quality buyer's agents from a ranking of buyer's agents determined by the method illustrated in FIGS. 1*a*-1*d*.

The method comprises the steps of 1) choosing a target area, 2) receiving buyer's agent performance data for all real estate buyer's agents in a target area from real estate databases in the target area, 3) removing any agent data for agents who acted as both the buyer's agent and the listing agent in the same transaction, 4) removing any agent data for agents who were part of fewer than a set number of completed sales, 5) ranking all real estate buyer's agents in an area by using a ranking algorithm on the remaining agent data, 6) and choosing the top three quality buyer's agents from the ranking.

Potential buyers who use this invention first need to choose a target search area. The target area is an area in which a buyer is interested in buying a property. The target area can be determined by an interview with potential buyers. Interview inputs may be made by an in-person conversation, telephone conversation, video chat, or any other transitory method of communication. Interview inputs can be transitory vocal, visual, or any other transitory input method which relies on delivering information to a service provider using the method described in this patent.

Upon providing the information to the service provider, a buyer may be required to sign an agreement. The agreement may include discussion of fees for the service and standard contractual terms regarding the service or services provided and limitations on liability. When collecting a fee from a buyer, the service provider may collect a flat fee or a fee based on the price of the real estate property. The fee may be collected at the beginning of the transaction when receiving information from the buyer, upon closing of the sale of the property, or at any time during the relationship between the service provider and a buyer. Alternatively, the service provider may elect to offer the services free to the buyer and charge the fee to the referred real estate buyer's agent. When collecting a fee from the buyer's agent, the fee charged by the service provider may be a flat fee, a fee based on the price of the real estate, or a percentage of the commission received by the buyer's estate agent.

Once the target area information is received by the service provider, follow-up communication may be performed by the service provider to a potential buyer. The follow-up communication is performed to verify the information supplied by the buyer, to verify the buyer is an actual person, and/or to provide customer service to the buyer. The follow-up communication may also be used to acquire some additional data from the buyer with regard to the type of real estate agent the buyer is seeking.

Once a potential buyer's target area is determined, the information is utilized to create a ranking of the best buyer's agents who operate at the target area. A primary example of a real estate database that may provide performance information to rank real estate buyer's agents is a local MLS system. The MLS system includes information such as addresses, type of property, listing/seller's prices, listing/seller's date, and listing/seller's agents' contact information. The real estate data may be arranged in a format which is easier for making calculations to rank and identify buyer's agents. The result may be a list of real estate buyer's agents who participated in the purchase of properties in the target area within a specified period of time. Included with the list of buyer's agents is corresponding data on transactions in which the buyer's agents were part of. This data may contain the sale prices of properties, the listing prices of properties, the name of the buyer's agent in transactions, the name of the listing agent in transactions, and the date of the transaction. Each table may correspond to one buyer's agent, and each row of each table may represent the data of one transaction which the buyer's agent was part of. The specified time may be between within the last month and the last ten years, with within the last year being preferable.

The data tables of the preceding step may be further manipulated to achieve useful results. Going consecutively through the rows in each data table, certain buyer's agent transactional rows should be removed if the buyer's agent in a transaction was the same as the listing agent in the same transaction. This step is necessary because we are only interested in instances where agents work solely in the best interest of the buyer. If the buyer's agent works as the listing agent too, he or she would not have any incentive to minimize the sale price. This step in our method for ranking and identifying the best buyer's agents in an area relies only on data for agents who act solely in a buyers' best interests. Therefore, transactional data for which the buyer's agent and listing agent were one and the same should be removed.

The data tables of the preceding step may be further manipulated to achieve useful results. Going consecutively through the rows in the data tables, we can calculate the number of times each buyer's agent successfully represented a buyer within the specified time. Then we remove the tables of the buyer's agents who have fewer than the CUTOFF number of transactions. The CUTOFF number may be chosen to be any number between 2 and 100, with 3 being the most useful in most real estate markets.

The data tables of the preceding step may be further manipulated to achieve useful results. Going consecutively through the data tables, a buyer's agent's performance score can be calculated for each buyer's agent. This calculation may be performed by calculating the percentage differences between the sum of all Buyer's prices and the sum of all listing prices of a buyer's agent's transactional data in their data tables.

For example, the buyer's agent A from FIG. 1 helped buyers to purchase 3 properties within the last year. Property 1 was listed for $100,000 and sold for $90,000. Property 2 was listed for $100,000 and sold for $80,000. Property 3 was listed for $100,000 and sold for $70,000. The average of these percentage differences may be taken to calculate the buyer's agent's performance score.

$$100\% - (\$90{,}000 + \$80{,}000 + \$70{,}000) / (\$100{,}000 + \$100{,}000 + \$100{,}000) = 20\%.$$

For the preceding example, buyer's agent A would have a performance score of 20%.

The buyer's agent B from FIG. 1 helped buyers to purchase 3 properties within the last year. Property 1 was listed for $100,000 and sold for $95,000. Property 2 was listed for $100,000 and sold for $90,000. Property 3 was listed for $100,000 and sold for $85,000.

$$100\% - (\$95{,}000 + \$90{,}000 + \$85{,}000) / (\$100{,}000 + \$100{,}000 + \$100{,}000) = 10\%.$$

The buyer's agent B would have a performance score of 10%.

A higher performance score corresponds to better buyer's agent results. A buyer's agent's performance score is the main factor in determining their rank.

The data tables of the preceding step may be further manipulated to achieve useful results. Going consecutively through the data tables, buyer's agents can be ranked on the basis of their Buyer's agent performance scores. A list of the best buyer's agents in an area may be created by placing the buyer's agent with the highest performance score in first place, the buyer's agent with the second-highest performance score in second place, the buyer's agent with the third-highest performance score in third place, and so on. If a real estate buyer's agent is ranked but not available at the moment to help a new buyer, the next highest ranking buyer's agent will take his or her place in the ranking, and every consecutive buyer's agent will move up one spot in the ranking. The ranking may contain every buyer's agent in the target area who was not removed in the preceding steps. Alternatively, the ranking may show up to the top 50 buyer's agents with the highest performance scores, preferably the top 3.

While there have been described what are believed to be the preferred embodiments of the present invention, those skilled in the art will recognize that other and further changes and modifications may be made thereto without departing from the spirit of the invention, and it is intended to claim all such changes and modifications that fall within the true scope of the invention.

I claim:

1. An apparatus for selecting the best buyer's agent comprising:

a substantially transparent circular base having a pole extending upwards from its center when the base lies flat;

three inserts, each insert having a proximal end and a distal end, the proximal end having a hole configured to receive the pole so that the insert lies substantially flat on the circular base when attached;

a rectangular map with a width and a height each greater than the diameter of the circular base;

a spinner configured to be attached to the pole after three inserts are attached to the pole, wherein the spinner is configured to spin at least a partial rotation around the circular base when engaged by a user;

wherein the substantially transparent circular base is comprised of plastic, and wherein the three inserts are configured to radially extend from the center of the base to the edge of the base;

wherein the arc of the distal end of each of the three inserts is 12.5 degrees;

wherein each insert has an arrow pointing away from its proximal end depicted on its distal end; and wherein each end of the spinner includes two wheels that facilitate the rotation of the spinner when it is engaged.

2. A method for selecting the best buyer's agent comprising:

providing a user with an apparatus comprising:

a substantially transparent circular base having a pole extending upwards from its center when the base lies flat;

three inserts, each insert having a proximal end and a distal end, the proximal end having a hole configured to receive the pole so that the insert lies substantially flat on the circular base when attached;

a rectangular map with a width and a height each greater than the diameter of the circular base;

a spinner configured to be attached to the pole after three inserts are attached to the pole, wherein the spinner is configured to spin at least a partial rotation around the circular base when engaged by a user;

arranging each insert on the circular base such that it corresponds to the primary physical business offices of three predetermined quality buyer's agents as indicated on the rectangular map;

actuating the spinner to initiate its rotation, where the spinner eventually comes to rest upon one of the attached inserts;

selecting the best buyer's agent associated with the insert at which the spinner points upon coming to rest;

wherein the substantially transparent circular base is comprised of plastic, and wherein the three inserts are configured to radially extend from the center of the base to the edge of the base;

wherein the arc of the distal end of each of the three inserts is 12.5 degrees;

wherein each insert has an arrow pointing away from its proximal end depicted on its distal end; and wherein each end of the spinner includes two wheels that facilitate the rotation of the spinner when it is engaged.

* * * * *